United States Patent
Inoue et al.

(10) Patent No.: US 11,242,993 B2
(45) Date of Patent: Feb. 8, 2022

(54) NOZZLE, BURNER, COMBUSTOR, GAS TURBINE, AND GAS TURBINE SYSTEM

(71) Applicant: MITSUBISHI HITACHI POWER SYSTEMS, LTD., Kanagawa (JP)

(72) Inventors: Kei Inoue, Tokyo (JP); Satoshi Takiguchi, Tokyo (JP); Shinji Akamatsu, Yokohama (JP); Kenta Taniguchi, Yokohama (JP); Naoki Abe, Yokohama (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 362 days.

(21) Appl. No.: 15/115,431

(22) PCT Filed: Mar. 12, 2015

(86) PCT No.: PCT/JP2015/057378
§ 371 (c)(1),
(2) Date: Jul. 29, 2016

(87) PCT Pub. No.: WO2015/141561
PCT Pub. Date: Sep. 24, 2015

(65) Prior Publication Data
US 2017/0130962 A1    May 11, 2017

(30) Foreign Application Priority Data

Mar. 20, 2014  (JP) .............................. JP2014-059127

(51) Int. Cl.
*F23R 3/16* (2006.01)
*F23R 3/14* (2006.01)
(Continued)

(52) U.S. Cl.
CPC ................ *F23R 3/16* (2013.01); *F02C 7/232* (2013.01); *F23D 14/82* (2013.01); *F23R 3/14* (2013.01); *F23R 3/28* (2013.01); *F23R 3/286* (2013.01)

(58) Field of Classification Search
CPC .... F23R 3/34; F23R 3/26; F23R 3/286; F23R 3/10; F23R 3/14; F01D 9/023;
(Continued)

(56) References Cited

U.S. PATENT DOCUMENTS

| 4,754,600 A | 7/1988 | Barbier et al. |
| 5,199,265 A | 4/1993 | Borkowicz |

(Continued)

FOREIGN PATENT DOCUMENTS

| CN | 101776017 | 7/2010 |
| CN | 102345879 | 2/2012 |

(Continued)

OTHER PUBLICATIONS

International Search Report dated Jun. 16, 2015 in International Application No. PCT/JP2015/057378 (with English Translation).
(Continued)

*Primary Examiner* — Gerald L Sung
*Assistant Examiner* — Jacek Lisowski
(74) *Attorney, Agent, or Firm* — Wenderoth, Lind & Ponack, L.L.P.

(57) ABSTRACT

A combustor provided with: a nozzle having formed therein an air jet section that causes air to be jetted from a nozzle section; a cylindrical part covering the nozzle from the outer peripheral side thereof and forming an air flow path between the cylindrical part and the nozzle; and a pressure loss section provided to the air flow path. The pressure loss section causes a loss of pressure in the air that flows through the air flow path. The nozzle is provided with: at least one
(Continued)

air inlet section that takes in air from an outer peripheral surface that is an upstream side from the pressure loss section; and a flow path-forming section forming a discharge air flow path that guides air that is taken in from the at least one air inlet section to the air jet section.

7 Claims, 7 Drawing Sheets (51) Int. Cl.
*F23R 3/28* (2006.01)
*F23D 14/82* (2006.01)
*F02C 7/232* (2006.01)

(58) Field of Classification Search
CPC .. F01D 21/00; F02C 7/22; F23C 2900/07001; F23C 7/008; F23C 7/004; F23D 14/00; F23D 14/82; F23N 5/08; F23N 5/24; F23M 11/02
See application file for complete search history.

(56) References Cited

U.S. PATENT DOCUMENTS

| | | | | |
|---|---|---|---|---|
| 6,122,916 A * | 9/2000 | Amos | ............ | F23D 23/00 60/747 |
| 6,334,309 B1 * | 1/2002 | Dean | ............ | F23D 11/101 60/737 |
| 6,530,222 B2 * | 3/2003 | Stuttaford | ............ | F23D 14/64 60/737 |
| 6,698,207 B1 * | 3/2004 | Wiebe | ............ | F23D 14/78 60/737 |
| 7,707,833 B1 * | 5/2010 | Bland | ............ | F23R 3/286 60/737 |
| 2003/0010036 A1 * | 1/2003 | Stuttaford | ............ | F02C 7/08 60/772 |
| 2009/0183511 A1 * | 7/2009 | Dinu | ............ | F23R 3/14 60/737 |
| 2010/0170216 A1 | 7/2010 | Venkataraman et al. | | |
| 2011/0005189 A1 | 1/2011 | Uhm et al. | | |
| 2012/0023952 A1 | 2/2012 | Vandervort et al. | | |
| 2012/0180490 A1 | 7/2012 | Takami et al. | | |
| 2013/0098044 A1 | 4/2013 | Singh | | |
| 2013/0157204 A1 * | 6/2013 | Hong | ............ | F23D 14/64 431/354 |
| 2013/0219899 A1 * | 8/2013 | Uhm | ............ | F23R 3/14 60/738 |

FOREIGN PATENT DOCUMENTS

| | | |
|---|---|---|
| CN | 103062799 | 4/2013 |
| DE | 602 15 351 | 5/2007 |
| DE | 10 2011 052 159 | 2/2012 |
| JP | 62-228630 | 10/1987 |
| JP | 7-119492 | 5/1995 |
| JP | 8-261466 | 10/1996 |
| JP | 2698464 | 1/1998 |
| JP | 2000-46333 | 2/2000 |
| JP | 3139978 | 3/2001 |
| JP | 2004-85123 | 3/2004 |
| JP | 2011-17334 | 1/2011 |
| JP | 2012-47442 | 3/2012 |
| JP | 2012-88036 | 5/2012 |
| JP | 2012-511687 | 5/2012 |
| JP | 2013-174431 | 9/2013 |

OTHER PUBLICATIONS

Written Opinion of the International Searching Authority dated Jun. 16, 2015 in International Application No. PCT/JP2015/057378.
Notice of Reasons for Rejection dated Mar. 28, 2017 in corresponding Japanese Application No. 2014-059127, with English translation.

* cited by examiner

NOZZLE, BURNER, COMBUSTOR, GAS TURBINE, AND GAS TURBINE SYSTEM

TECHNICAL FIELD

The present invention relates to a nozzle used for a combustor, a burner, a combustor, a gas turbine, and a gas turbine system.

This application claims priority based on Japanese Patent Application No. 2014-059127 filed in Japan on Mar. 20, 2014, of which the contents are incorporated herein by reference.

BACKGROUND ART

In a combustor of a gas turbine, a premix type combustion method has been widely used. The premix type combustion method premixes fuel with compressed air (combustion air) fed from a compressor to generate fuel-air mixture and causes the fuel-air mixture to be combusted (for example, see Patent Documents 1 to 3).

As this kind of combustor, there is known a combustor that has a pilot nozzle provided on the central axis line of the combustor and has a plurality of main nozzles arranged in parallel to the pilot nozzle.

In a gas turbine combustor employing such a premix type combustion method, a flashback may occur. Flashback is a phenomenon in which flame flows back in a direction opposite to the flow direction of the fuel-air mixture in an area where the flow velocity of the fuel-air mixture is low.

Patent document 4 discloses a configuration provided with, in the vicinity of the downstream end portion of a swirler, a fluid jet hole from which a fluid such as air is jetted. The swirler is provided on the outer peripheral side of the main nozzle and causes the compressed air fed from the compressor to be swirled. This configuration reduces the area where the flow velocity of the fuel-air mixture is low by jetting the fluid from the fluid jet hole at high speed and prevents the occurrence of the flashback by reducing the fuel concentration of the downstream end portion.

CITATION LIST

Patent Documents

Patent Document 1: Japanese Unexamined Patent Application Publication No. 2000-46333A
Patent Document 2: Japanese Patent No. 3139978
Patent Document 3: Japanese Unexamined Patent Application Publication No. H8-261466A
Patent Document 4: Japanese Unexamined Patent Application Publication No. 2011-17334A

SUMMARY OF INVENTION

Technical Problem

However, in the configuration provided with the fluid jet hole in the vicinity of the downstream end portion of the swirler as described in Patent Document 4, the occurrence of the flashback can be prevented by jetting the fluid in a limited portion. For example, an effect of preventing the occurrence of the flashback by jetting the fluid cannot be achieved at the tip of the main nozzle.

The flow velocity becomes low at the portion in the vicinity of the tip portion of the main nozzle because the portion serves as a vortex core of the swirling flow generated by the swirler. Thus, when the flashback occurs, flame flows back toward the tip portion of the main nozzle.

If the flame flowing back slows down in the vicinity of the nozzle tip, the nozzle tip can be burnt.

The present invention provides a nozzle, a burner, a combustor, a gas turbine, and a gas turbine system that can reliably prevent the flashback toward the nozzle tip portion.

Solution to Problem

In the first aspect of the present invention, a combustor is provided with a nozzle configured to jet fuel. The nozzle is provided with an air jet section that causes air to be jetted from a tip portion.

In the second aspect of the present invention, a burner is provided with the nozzle and the burner jets fuel.

In the third aspect of the present invention, a combustor is provided with a burner described in the second aspect. The combustor is provided with: a cylindrical part covering the nozzle from an outer peripheral side thereof and forming an air flow path between the cylindrical part and the nozzle; and a pressure loss section provided to the air flow path, the pressure loss section causing a loss of pressure in the air that flows through the air flow path. The nozzle is provided with: at least one air inlet section that takes in air from an outer peripheral surface that is an upstream side from the pressure loss section; and a flow path-forming section forming a flow path that guides air that is taken in from the at least one air inlet section to the air jet section.

In the fourth aspect of the present invention, the at least one air inlet section described in the third aspect comprises a plurality of air inlet sections, the combustor may be configured such that the plurality of air inlet sections are provided on the outer peripheral surface of the nozzle and such that the flow path-forming section is provided with a merging section that causes air that is taken in from the plurality of air inlet sections to be merged at an upstream side from the air jet section.

In the fifth aspect of the present invention, the combustor may be configured such that the flow path-forming section described in the third aspect forms a flow path having an annular cross section.

In the sixth aspect of the present invention, the combustor may be configured such that the flow path-forming section described in the third aspect forms a plurality of flow paths arranged concentrically.

In the seventh aspect of the present invention, a gas turbine is provided with: a combustor described in any one of the third to fifth aspects; and a turbine main body provided with a rotor that is rotated by combustion gas fed from the combustor.

In the eighth aspect of the present invention, a gas turbine system is provided with: a combustor provided with the nozzle described in the first aspect; a turbine main body provided with a rotor that is rotated by combustion gas fed from the combustor; a chamber air supply section that supplies air in a chamber of the turbine main body to the air jet section; a control valve that controls the air supply from the chamber of the turbine main body to the air jet section in the chamber air supply section; a detecting section that detects occurrence of a flashback in the combustor; and a control device that controls opening/closing of the control valve on the basis of a detection result of the detecting section.

Advantageous Effects of Invention

Using the nozzle, the burner, the combustor, the gas turbine, and the gas turbine system described above can reliably prevent the flashback toward the nozzle tip portion.

DESCRIPTION OF EMBODIMENTS

A nozzle, a burner, a combustor, a gas turbine, and a gas turbine system according to the embodiments of the present invention will now be described with reference to the drawings.

First Embodiment

Figure 1:
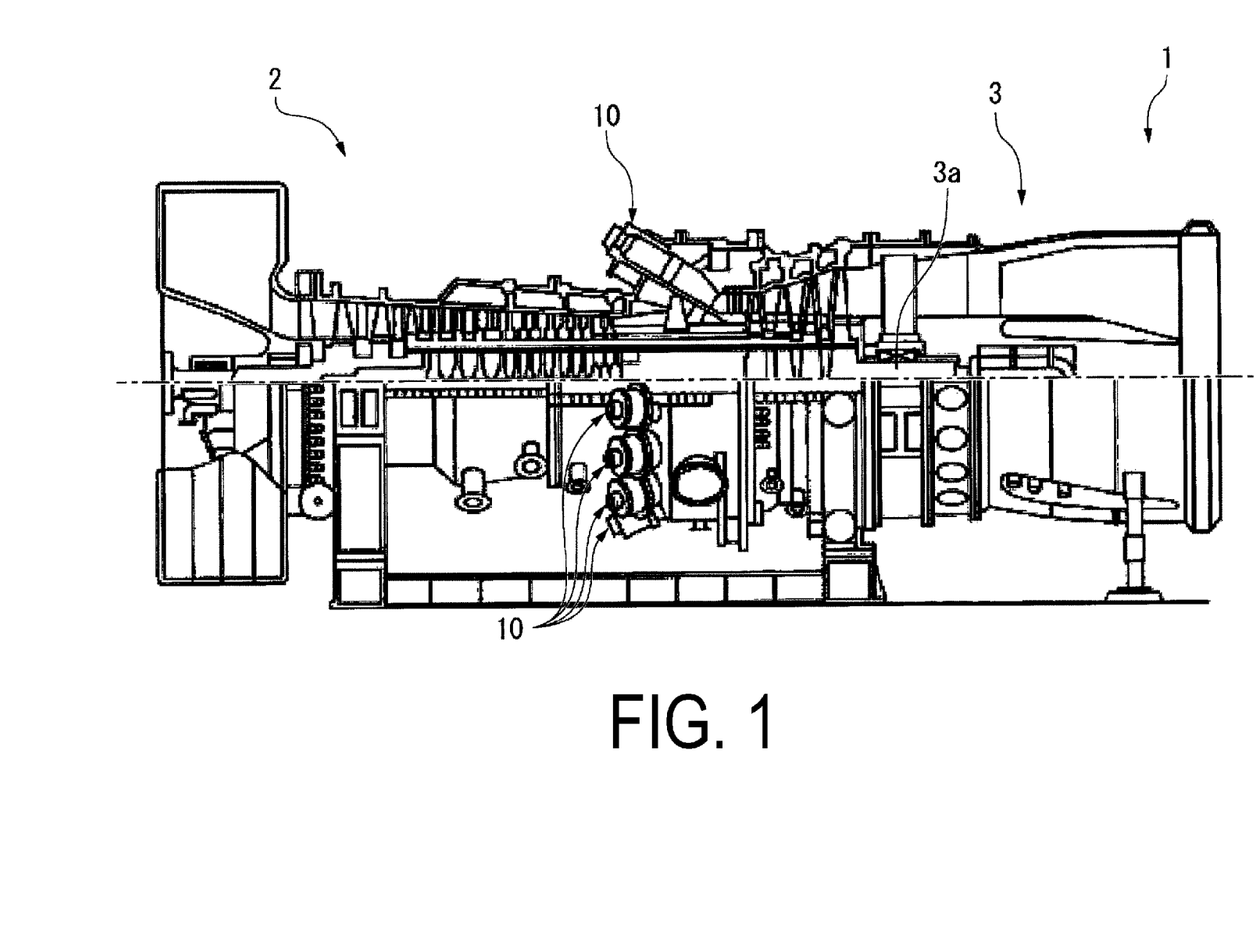
FIG. 1 is a half cross-sectional view illustrating an overview configuration of a gas turbine according to a first embodiment.
Figure 2:
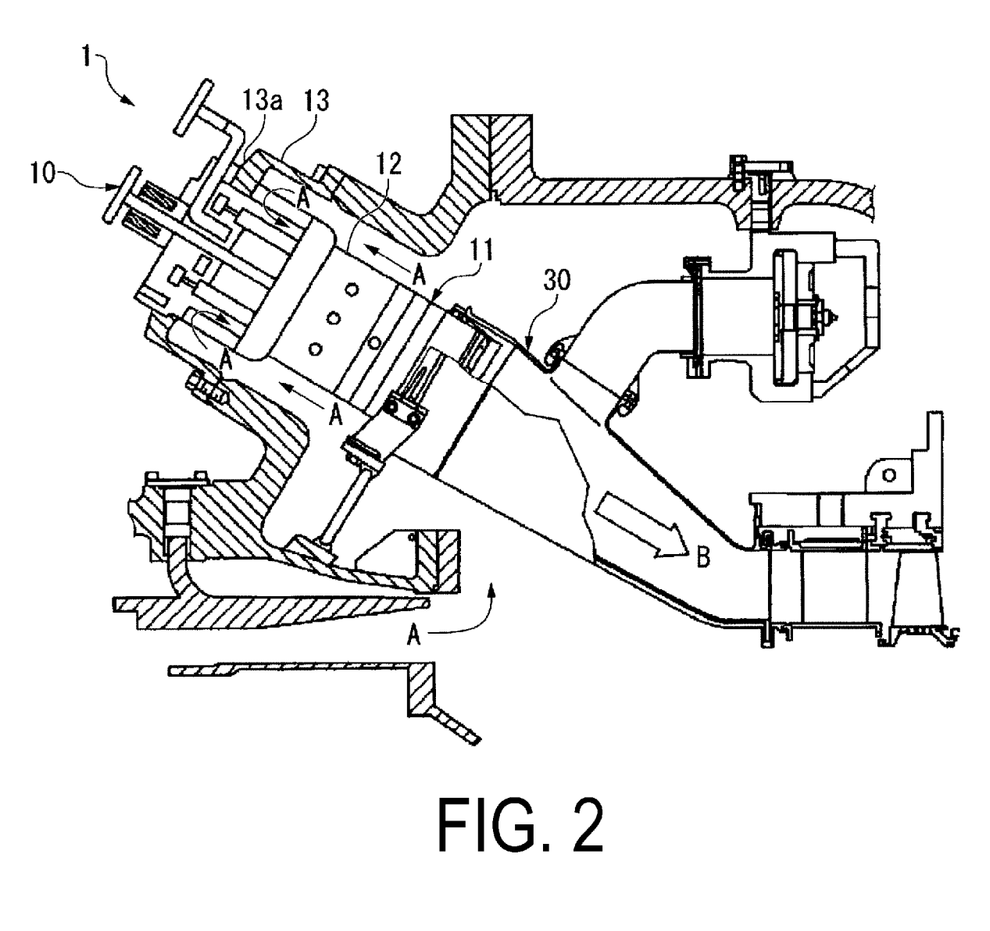
FIG. 2 is a cross-sectional view illustrating a combustor according to the first embodiment of the gas turbine.
Figure 3:
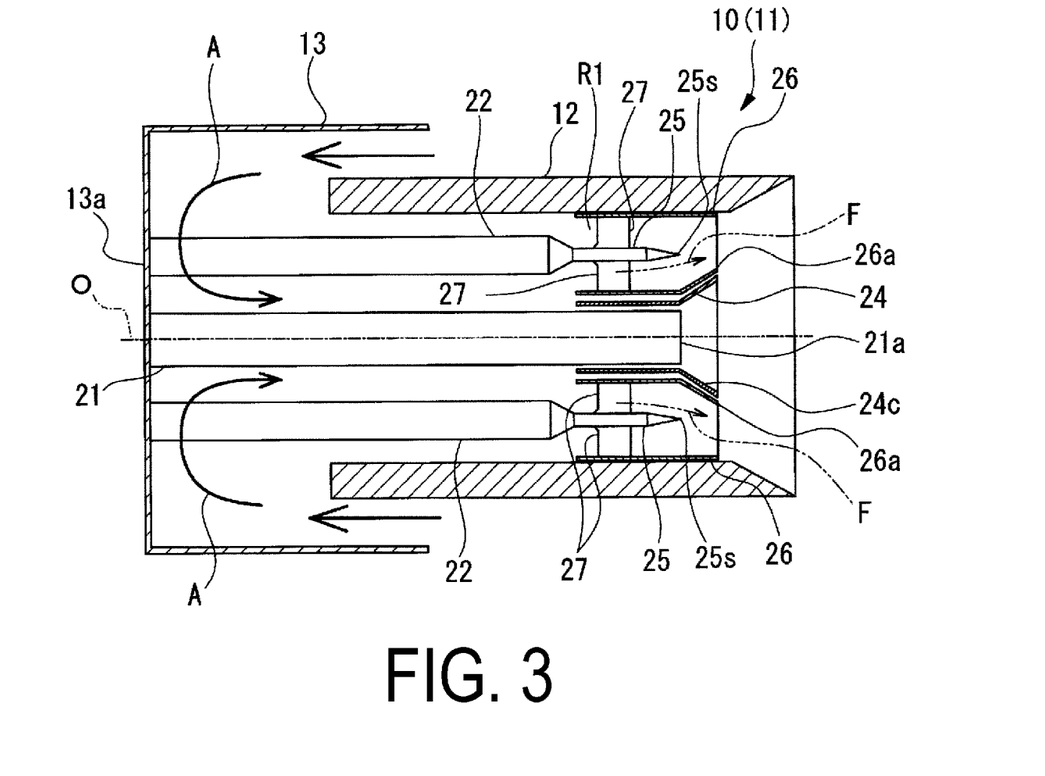
FIG. 3 is a cross-sectional view illustrating the configuration of the combustor.

FIG. 1 is a half cross-sectional view illustrating an overview configuration of a gas turbine according to this embodiment. FIG. 2 is a cross-sectional view illustrating a combustor provided in the gas turbine. FIG. 3 is a cross-sectional view illustrating the configuration of the combustor.

As illustrated in FIG. 1, a gas turbine 1 in this embodiment is provided with a compressor 2, a plurality of combustors 10, and a turbine (turbine main body) 3.

The compressor 2 takes in air from an air inlet port as a working fluid and generates compressed air.

The combustor 10 is connected to a discharge port of the compressor 2. The combustor 10 jets fuel to the compressed air discharged from the compressor 2 to cause a combustion gas that has a high temperature and a high pressure to be generated.

The turbine 3 converts the thermal energy of the combustion gas fed from the combustor 10 into a rotation energy for a rotor 3a and causes a driving force to be generated. The turbine 3 transfers the generated driving force to a generator (not illustrated) coupled to the rotor 3a.

As illustrated in FIG. 2, each combustor 10 is provided with a combustor main body 11 and a transition pipe 30. The combustor main body 11 functions as a combustion chamber that causes the supplied fuel to react with the compressed air A. The transition pipe 30 increases the flow velocity of the combustion gas 13 flowing in from the combustor main body 11 and introduces the combustion gas B into the turbine 3 at the downstream.

As illustrated in FIGS. 2 and 3, the combustor main body 11 is provided with an inner cylinder 12 and an outer cylinder 13. The inner cylinder 12 is formed in a cylindrical shape. The outer cylinder 13 is provided concentrically on the outer peripheral side of one end side in the central axis direction of the inner cylinder 12.

The compressed air A flowing from between the outer cylinder 13 and the inner cylinder 12 into the combustor main body 11 is turned by 180° at one end side 13a of the outer cylinder 13 and is supplied into the inner cylinder 12.

As illustrated in FIG. 3, the combustor main body 11 is provided with a pilot burner 21 and main burners (burner) 22 in the inner cylinder 12.

The pilot burner 21 is provided along the central axis O of the inner cylinder 12. The pilot burner 21 jets, from a tip portion 21a, fuel supplied from the outside. The pilot burner 21 generates flame by igniting the jetted fuel. The pilot burner 21 is provided with a pilot corn 24. The pilot corn 24 is formed in a cylindrical shape surrounding the outer peripheral side of the tip portion 21a of the pilot burner 21. The pilot corn 24 has a tapered corn portion 24c that gradually increases the inner diameter thereof from the vicinity of the tip portion 21a of the pilot burner 21 toward the direction in which the flame is generated. The tapered corn portion 24c improves flame stability by regulating the diffusion range and direction of the flame.

The plurality of main burners 22 are provided in the cylinder 12. The main burners 22 are arranged on the outer peripheral side of the pilot burner 21 with spaces therebetween in a circumferential direction. Each main burner 22 extends in parallel with the central axis O of the inner cylinder 12.

A main nozzle (nozzle) 25 is provided on the tip portion of the main burner 22. The main nozzle 25 has a circular cone shape that gradually decreases the outside diameter thereof toward the tip portion 25s.

The main burner 22 is provided with a cone part (cylindrical part) 26 on the outer peripheral side of the main nozzle 25. The cone part 26 has a cylindrical shape and is provided such that the main nozzle 25 is surrounded from the outer peripheral side thereof. The cone part 26 is formed by causing a side 26a proximate to the pilot corn 24 at the center side of the inner cylinder 12 to be gradually slanted to the outer peripheral side toward the direction in which the flame is generated. The cone part 26 forms a primary flow path R1 in which the compressed air A flows between the cone part 26 and the main burner 22.

The main burner 22 is provided with a main swirler (pressure loss section) 27 in the cone part 26. The main swirler 27 imparts a swirling force to the flow in the primary flow path R1.

The main burner 22 jets the fuel (main fuel) from a fuel nozzle (not illustrated) provided on the outer peripheral surface side of the main burner 22, for example, on the main swirler 27. The fuel nozzle (not illustrated) may be provided at a portion other than the main swirler 27, for example, at a portion that is a downstream side from an air inlet port 52, which will be described later, on the outer peripheral surface side of the main burner 22. The fuel is mixed with the compressed air A in the inner cylinder 12 to become a fuel-air premixture F. The swirling flow generated by the main swirler 27 causes the fuel-air premixture F to flow through the primary flow path R1 toward the downstream while swirling around the main burner 22.

Figure 4:
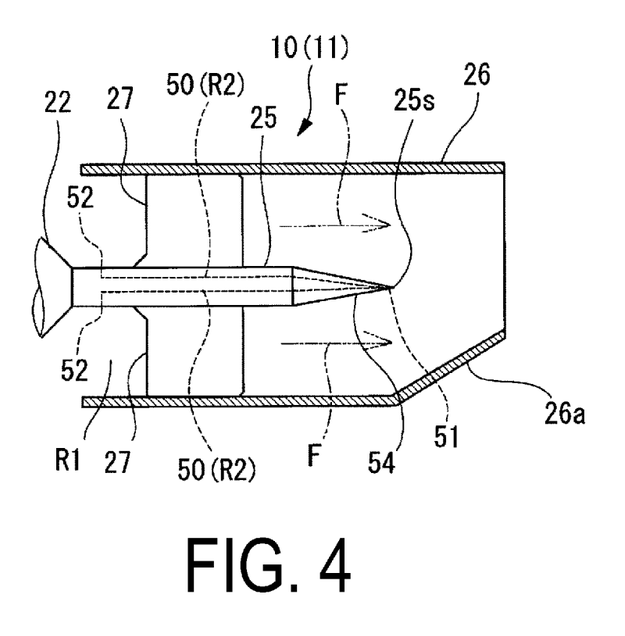
FIG. 4 is a cross-sectional view illustrating the configuration of a main nozzle of the combustor.
Figure 5:
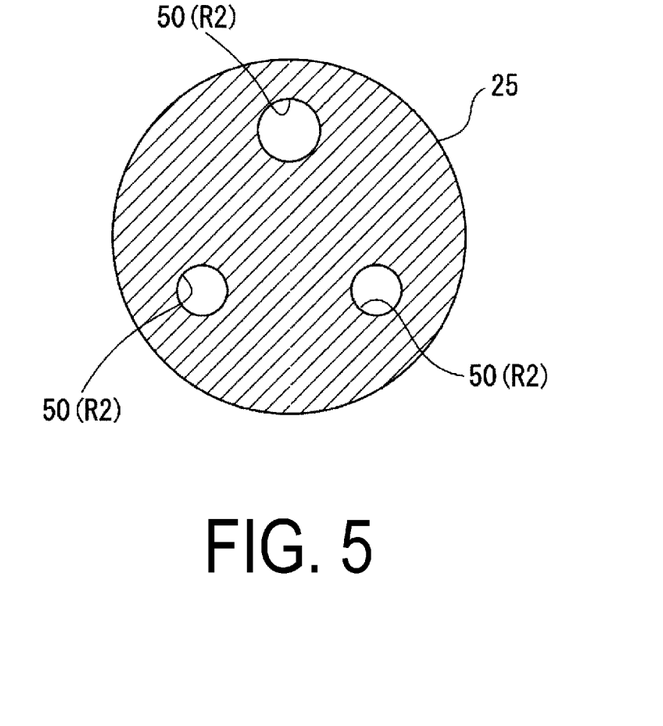
FIG. 5 is a cross-sectional view orthogonal to an axis of the main nozzle.

FIG. 4 is a cross-sectional view illustrating the configuration of the main nozzle of the combustor. FIG. 5 is a cross-sectional view orthogonal to the axis of the main nozzle.

As illustrated in FIG. 4, the main nozzle 25 is provided with a flow path hole (a flow path-forming section) 50, an air jet port (air jet section) 51, and air inlet ports (air inlet section) 52.

The flow path hole 50 extends in the axial direction of the main nozzle 25. As illustrated in FIGS. 4 and 5, in this embodiment, a plurality of flow path holes 50 are formed. The flow path holes 50 are arranged with spaces therebetween in a circumferential direction of the main nozzle 25. The flow path holes 50 are arranged concentrically to the main nozzle 25. While FIG. 5 illustrates the case in which three flow path holes 50 are formed, the flow path holes 50 may be two or more. The flow path-forming section of the present invention is formed of the plurality of flow path holes 50.

As illustrated in FIG. 4, the air jet port 51 is opened and formed at the tip portion 25s of the main nozzle 25.

The plurality of air inlet ports 52 are formed on the outer peripheral surface of the main nozzle 25. Each air inlet port 52 is formed by causing one end of the flow path hole 50 to be opened on the outer peripheral surface of the main nozzle 25. Each air inlet port 52 is opened at the upstream side from the main swirler 27 on the outer peripheral surface of the main nozzle 25.

The plurality of flow path holes 50 are merged into one at a merging section 54 in the main nozzle 25 to communicate with one air jet port 51. In this way, the flow path holes 50 form a jetted air flow path R2 that guides the compressed air A taken in from the air inlet port 52 that is an upstream side from the main swirler 27 to the air jet port 51 at the tip portion 25s of the main nozzle 25.

In the main burner 22 provided with such a main nozzle 25, part of the compressed air A flowing through the primary flow path R1 flows into the flow path hole 50 from the air inlet port 52 and then is jetted from the air jet port 51 at the tip portion 25s of the main nozzle 25. When the compressed air A is jetted from the air jet port 51, the fuel concentration of the fuel-air premixture F in the vicinity of the tip portion 25s of the main nozzle 25 is lowered. Also, the flow velocity of the fuel-air premixture F at the tip portion 25s of the main nozzle 25 is increased by the compressed air A jetted from the air jet port 51.

In the primary flow path R1 formed between the main nozzle 25 and the cone part 26, a pressure loss of the fuel-air premixture F flowing through the primary flow path R1 occurs due to the swirling of the fuel-air premixture F at the main swirler 27. The main nozzle 25 has the air inlet port 52 at the upstream side from the main swirler 27 and has the air jet port 51 of the tip portion 25s of the main nozzle 25 at the downstream side from the main swirler 27. Thus, with the pressure loss at the main swirler 27, there is caused a pressure difference between the air inlet port 52 and the air jet port 51. Specifically, the pressure on the air inlet port 52 side is higher than the pressure on the air jet port 51 side. The pressure difference generates a flow coming from the air inlet port 52 to the air jet port 51 in the jetted air flow path R2 formed by the flow path hole 50. In this way, air can be taken appropriately from the air inlet port 52 formed on the outer peripheral surface of the main nozzle 25 into the jetted air flow path R2.

Therefore, according to the first embodiment described above, by providing the air jet port 51 at the tip portion 25s of the main nozzle 25, the fuel concentration of the fuel-air premixture F in the vicinity of the tip portion 25s of the main nozzle 25 is lowered when the compressed air A is jetted from the air jet port 51. This makes it unlikely for flame to be generated at the tip portion 25s of the main nozzle 25. Also, the flow velocity of the fuel-air premixture F at the tip portion 25s of the main nozzle 25 is increased by the compressed air A jetted from the air jet port 51. Thus, when a flashback occurs, flame is unlikely to flow back toward the tip portion 25s of the main nozzle 25.

In this way, the backflow and occurrence of the flashback toward the tip portion 25s of the main nozzle 25 can be prevented reliably. As a result, the burnout of the main nozzle 25 can also be avoided.

Additionally, the flow path hole 50 communicating with the air jet port 51 has the air inlet port 52 at the upstream side from the main swirler 27 and has the air jet port 51 of the tip portion 25s of the main nozzle 25 at the downstream side from the main swirler 27. Thus, with the pressure difference between the air inlet port 52 and the air jet port 51 that is caused by the pressure loss at the main swirler 27, air can be taken appropriately from the air inlet port 52 into the jetted air flow path R2. This allows to prevent a flashback reliably and efficiently.

The main nozzle 25 has a plurality of sets of the air inlet port 52 and the flow path hole 50 and these sets are merged at the merging section 54. This causes the air taken in from the plurality of air inlet ports 52 to flow through the jetted air flow path R2 formed at the flow path hole 50 and the air is merged at the merging section 54. Then, the merged air is jetted from the air jet port 51. This makes it possible to increase the amount of air jetted from the air jet port 51.

Furthermore, because the flow path-forming section forms a plurality of flow path holes 50 concentrically, the cross-sectional area of the flow path can easily be enlarged and the workability of the flow path-forming section can be improved.

Modification of First Embodiment

In the first embodiment described above, the main nozzle 25 is provided with, but not limited to, the plurality of flow path holes 50.

Figure 6:
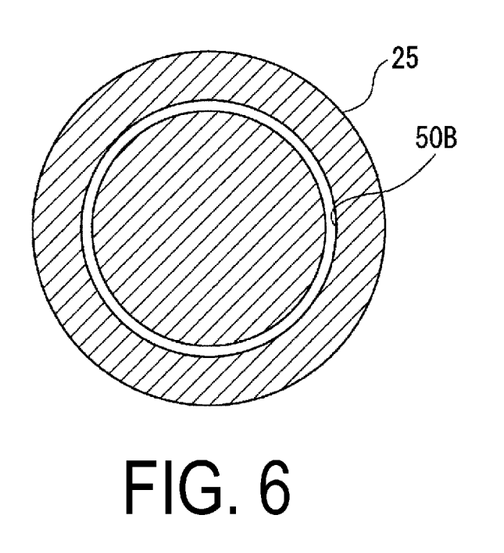
FIG. 6 illustrates a modification of the main nozzle.

FIG. 6 illustrates a modification of the main nozzle.

As illustrated in FIG. 6, the flow path hole 50B may be formed such that the shape of the cross-section thereof is annulus. This can be achieved by configuring the main nozzle 25 as a double pipe structure.

Such configuration allows for the cross-sectional area of the flow path to be enlarged easily to secure sufficient size of the cross-sectional area compared with the case in which the plurality of flow path holes 50 are provided together. This makes it possible to increase the amount of air jetted from the air jet port 51.

Second Embodiment

A gas turbine system according to the present invention will now be described. In the second embodiment described below, same parts as the first embodiment will be described using same characters, and overlapping descriptions will be omitted.

Figure 7:
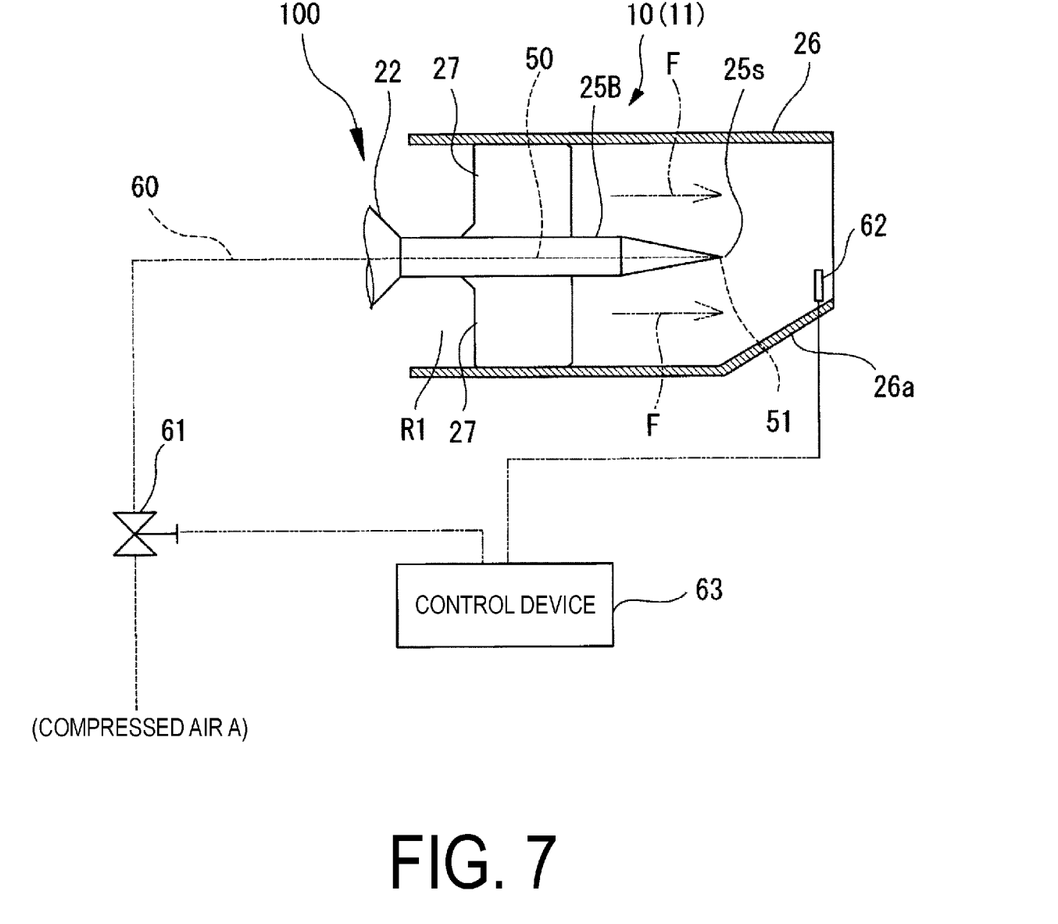
FIG. 7 illustrates an overview configuration of a gas turbine system according to a second embodiment.

FIG. 7 illustrates an overview configuration of a gas turbine system according to the second embodiment.

As illustrated in FIG. 7, a gas turbine system 100 in this embodiment is provided with a combustor 10, a turbine 3 (see FIG. 1), a chamber air supply pipe (chamber air supply section) 60, a control valve 61, a detecting sensor (detecting section) 62, and a control device 63.

A main nozzle 25B of the main burner 22 provided on the combustor 10 is provided with an air jet port 51 at a tip portion 25s. In the main nozzle 25B, a flow path hole 50 that communicates with the air jet port 51 at one end is formed.

The chamber air supply pipe 60 is connected to the other end of the flow path hole 50 of the main nozzle 25B. The chamber air supply pipe 60 supplies the compressed air A in a chamber of the turbine 3 to the air jet port 51. The air is thereby jetted from the air jet port 51 of the main nozzle 25B.

The control valve 61 is provided on the chamber air supply pipe 60. By opening/closing the control valve 61, the supply of the compressed air A from the chamber to the air jet port 51 in the chamber air supply pipe 60 is controlled.

The detecting sensor 62 detects the occurrence of a flashback in the combustor 10. As this kind of detecting sensor 62, a temperature sensor, a pressure sensor, a luminous intensity sensor, and the like provided in the vicinity of the main nozzle 25B of the main burner 22 can be used. The detecting sensor 62 detects a temperature, a pressure, a luminous intensity, and the like in the vicinity of the main nozzle 25B and outputs the detected data to the control device 63.

The control device 63 controls the opening/closing of the control valve 61 on the basis of the detection result of the detecting sensor 62. The control device 63 determines whether or not a flashback has occurred in the vicinity of the main nozzle 25B by monitoring the change in parameters such as a temperature, a pressure, a luminous intensity, and the like detected by the detecting sensor 62. And if the control device 63 determines that the flashback has occurred, the control device 63 opens the control valve 61.

When the control valve 61 is opened, the compressed air A in the chamber of the turbine 3 is supplied to the air jet port 51 via the chamber air supply pipe 60. This causes the air to be jetted from the air jet port 51 of the main nozzle 25B, which makes it possible to prevent the backflow and occurrence of the flashback toward the tip portion 25s of the main nozzle 25 reliably. As a result, the burnout of the main nozzle 25 can be avoided.

When the operation state of the gas turbine 1 becomes a predetermined state, the control device 63 may open the control valve 61 to cause the air to be jetted from the air jet port 51 of the main nozzle 25B.

In accordance with such a gas turbine system 100, the compressed air A can be jetted from the air jet port 51 on the basis of the control by the control device 63 when a flashback occurs, likely to occur, or the like. This enables to prevent the backflow and occurrence of the flashback toward the tip portion 25s of the main nozzle 25.

This sort of control can stop the air from being jetted from the air jet port 51 when not required.

Other Modifications

In the above embodiments, the main swirler 27 functions as the pressure loss section, but the pressure loss section is not limited to the main swirler 27. Any configuration is possible so long as the configuration can cause a loss of pressure in the air that flows through the air flow path.

INDUSTRIAL APPLICABILITY

The present invention can be applied to a nozzle, a burner, a combustor, a gas turbine, and a gas turbine system and enables to prevent the flashback toward the nozzle tip portion reliably.

REFERENCE SIGNS LIST

1 Gas turbine
2 Compressor
3 Turbine (turbine main body)
3a Rotor
10 Combustor
11 Combustor main body
12 Inner tube
13 Outer tube
13a One end side
21 Pilot burner
21a Tip portion
22 Main burner (burner)
24 Pilot corn
24c Tapered corn portion
25, 25B Main nozzle (nozzle)
25s Tip portion
26 Cone part (cylindrical part)
27 Main swirler (pressure loss section)
30 Transition pipe
50, 50B Flow path hole (flow path-forming section)
51 Air jet port (air jet section)
52 Air inlet port (air inlet section)
54 Merging section
60 Chamber air supply pipe (chamber air supply section)
61 Control valve
62 Detecting sensor (detecting section)
63 Controlling device
100 Gas turbine system
A Compressed air
B Combustion gas
F Fuel-air premixture
O Central axis
R1 Primary flow path
R2 Jetted air flow path

The invention claimed is:

1. A combustor comprising:
a burner having at a tip portion thereof a nozzle configured to jet fuel, the nozzle comprising:
  a circular cone shaped tip that gradually decreases an outside diameter thereof toward a tip portion;
  one air jet section configured to jet only air from the circular cone shaped tip; and
  a flow path-forming section defining a plurality of flow path holes, extending in an axial direction, wherein the plurality of flow path holes are merged into one path in a merging section to communicate with the one air jet section,
a cylindrical part covering the nozzle from an outer peripheral side thereof, so that an air flow path is formed between the cylindrical part and the nozzle; and
a pressure loss section provided in the air flow path, the pressure loss section causing a loss of pressure in the air that flows through the air flow path;
the nozzle further comprising:
at least one air inlet section that takes in a part of the air that flows through the air flow path from an outer peripheral surface that is an upstream side relative to the pressure loss section,
wherein the flow path-forming section guides the air that is taken in from the at least one air inlet section to the one air jet section,
wherein the at least one air inlet section comprises a plurality of air inlet sections,
wherein the plurality of air inlet sections are provided on the outer peripheral surface of the nozzle,
wherein the flow path-forming section comprises the merging section that causes the air that is taken in from the plurality of air inlet sections to be merged at an upstream side relative to the one air jet section, and wherein each of the plurality of air inlet sections is an opening that extends radially from the outer peripheral surface of the nozzle to an end of a respective one of the plurality of flow path holes.

2. The combustor according to claim 1, wherein the flow path-forming section forms a flow path having an annular cross section.

3. The combustor according to claim 1, wherein the flow path-forming section forms a plurality of flow paths arranged concentrically.

4. A gas turbine, comprising:

the combustor described in claim 1; and a turbine main body comprising a rotor that is rotated by combustion gas fed from the combustor.

5. A gas turbine system, comprising:

the combustor according to claim 1;

a turbine main body comprising a rotor that is rotated by combustion gas fed from the combustor;

a chamber air supply section that supplies the air in a chamber of the turbine main body to the one air jet section;

a control valve that controls the air supply from the chamber of the turbine main body to the one air jet section in the chamber air supply section;

a detecting section that detects occurrence of a flashback in the combustor; and a control device that controls opening/closing of the control valve on the basis of a detection result of the detecting section.

6. A gas turbine, comprising:

the combustor described in claim 1; and a turbine main body comprising a rotor that is rotated by combustion gas fed from the combustor.

7. A gas turbine, comprising:

the combustor described in claim 2; and a turbine main body comprising a rotor that is rotated by combustion gas fed from the combustor.

* * * * *